(No Model.)

E. M. BIRDSALL.
TRACTION ENGINE.

No. 320,752. Patented June 23, 1885.

WITNESSES
Ed. A. Newman
Al. C. Newman

INVENTOR
E. M. Birdsall.
By his Attorneys
Baldwin, Hopkins, & Payton

UNITED STATES PATENT OFFICE.

EDGAR M. BIRDSALL, OF AUBURN, NEW YORK.

TRACTION-ENGINE.

SPECIFICATION forming part of Letters Patent No. 320,752, dated June 23, 1885.

Application filed March 19, 1885. (No model.)

*To all whom it may concern:*

Be it known that I, EDGAR M. BIRDSALL, of Auburn, in the county of Cayuga and State of New York, have invented certain new and useful Improvements in Gearing or Mechanism for the Improvement of the Operation of Traction-Engines, of which the following is a specification, reference being had to the accompanying drawings.

My improvements are particularly adapted to that class of traction-engines shown in my United States Patent No. 266,343, granted October 24, 1882, to which patent, for convenience of shortening description, I make this reference.

The particular purpose of my improvements is to provide simple and convenient means for readily increasing or decreasing the speed of driving the traction-wheels by means of shifting gear connections such as I will now proceed to describe in detail.

It will be understood that traction-engines are provided with steam-boilers and traction and carrying wheels, and the ordinary steam-engine mechanism, such as illustrated in my aforesaid patent; and I have therefore illustrated no more in the accompanying drawings than is merely necessary to show the particulars of my improvements.

Figure 3:
Figure 1:
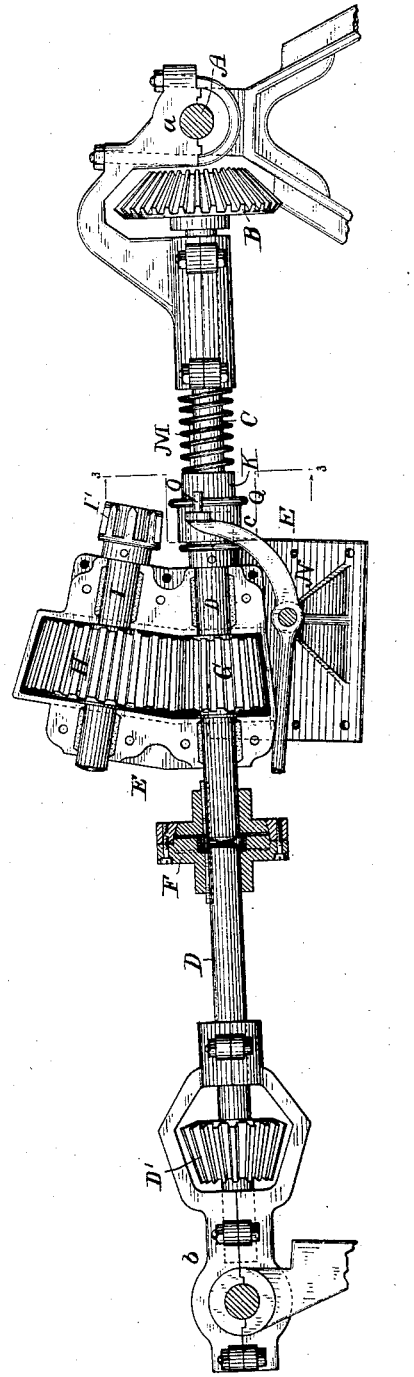
Figure 2:

In the drawings, Figure 1 is an elevation of shafts and gearing to be secured upon the boiler or supporting frame-work of a traction-engine in any usual or suitable manner. Fig. 2 is a view of a shipping-lever detached, and Fig. 3 is a cross-section on the line 3 3 of Fig. 1.

Referring to the letters upon the drawings, A indicates a main driving-shaft, to which it may be assumed that rotary motion is given by the piston-rod of the traction-engine. This shaft rests in suitable bearings, as illustrated, which are supported in any ordinary and suitable way upon the boiler.

A beveled pinion (not illustrated) is applied to the shaft A, which gears with a bevel-wheel, B, fixed upon one end of the driven shaft C. The shaft D has another bevel-wheel, D', that gears with a suitable pinion and intermediate gears connecting with the main traction-wheel, substantially as illustrated in my said patent, but not here shown. The shaft D is provided with central bearings at E, and is also provided with a suitable flexible-jointed coupling at F. These bearings and this coupling, and in fact all of the individual parts thus far described, are in themselves not new, but may be employed in connection with what is new in my device. The opposite end bearings, *a b*, of the shafts C and D are, as is well understood, pivoted.

G indicates a central bevel-wheel fixed to the shaft D, and gearing with another bevel-wheel, H, of larger diameter, upon a short inclined shaft, I. The shafts C and D are coupled at about the point *c* by a coupling mechanism, by which the shaft C may be disconnected and raised and connected again with the inclined shaft I in the same manner as the drawings show it connected at the point *c*. The coupling mechanism consists of a sliding sleeve, K, provided with inwardly-projecting ribs or splines L, corresponding to the radial depressions or slots shown in the periphery of the fixed sleeve I' upon the end of the shaft I. The end of the shaft C, where the sleeve is shown engaged, or in the position for coupling the shafts C and D, is similarly constructed and provided with a fixed slotted and ribbed sleeve. The sliding sleeve is permanently secured to the end of the shaft C by means of a spline or otherwise, and is normally pushed backward into the coupling position by the coil-spring M.

Fig. 3 illustrates in cross-section the sleeves in the position of coupling the shafts.

N indicates a brace or bracket, which stands out laterally from the shaft D a sufficient distance to form at its end O a fulcrum for the shipping-lever P. (Shown detached in Fig. 2.) When it is desired, for example, to uncouple the two shafts C and D, the shipping-lever, being upon its fulcrum, is first employed to bear against the annular projection or flange Q and press the sliding sleeve forward against its coil-spring, so as to disengage it from the shaft D. The shipping-lever then serves to raise up the end of the shaft C, carrying with it the sliding coupling-sleeve, and at the same time holding it pressed back against its spring until it is in position to register or engage with the coupling-sleeve on the end of the inclined shaft I, when the pressure of the lever is released, and the coil-spring will force the sleeve backward, so as to couple with the inclined shaft. The gear-wheel H upon the inclined shaft being of larger diameter than the gear-wheel G, the same velocity of movement of the engine will serve through this gearing to drive the shaft D more rapidly than when it is coupled with shaft C. This is for the purpose of propelling the traction-engine more rapidly over smooth ground, and the coupling, uncoupling, and recoupling can be done quickly. By this simple means the speed of travel of the traction-engine over the ground can be varied by the operator under a given steam-pressure, so as to make it either fast or slow.

The spring M might be dispensed with and the shipping-lever made to do the coupling as well as the uncoupling; but this is not preferable.

Having thus described my improvements, what I desire to claim as new, and to secure by Letters Patent of the United States, is—

1. The combination, with the driven shaft C of a traction-engine, of the inclined shaft I, and connecting-gears, and the coupling mechanism, substantially as and for the purposes set forth.

2. The combination of the driven shaft C, severed at c, and provided with a fixed sleeve upon one part and a sliding sleeve, K, upon the other, and spring and shipping-lever, and an inclined shaft, I, provided with a fixed sleeve, I', all constructed and operating substantially as set forth.

In testimony whereof I have hereunto subscribed my name.

EDGAR M. BIRDSALL.

Witnesses:
T. J. MOSHER,
JNO. E. BURR.